C. D. CAUGHRON.
GRAVITY OPERATED LEVEL.
APPLICATION FILED NOV. 4, 1913.
1,141,315.
Patented June 1, 1915.
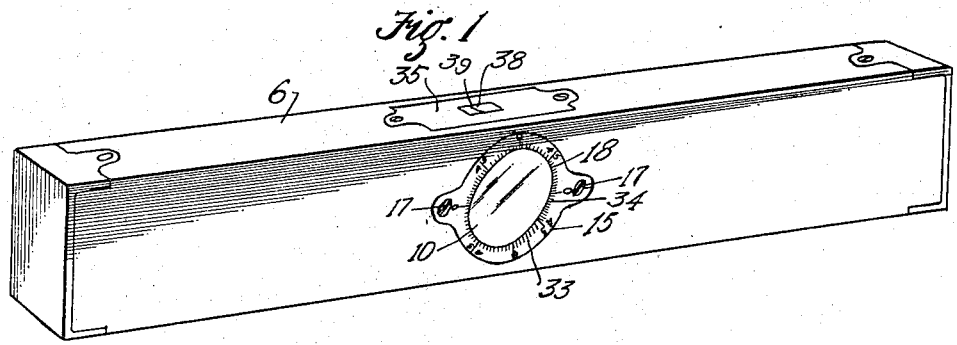
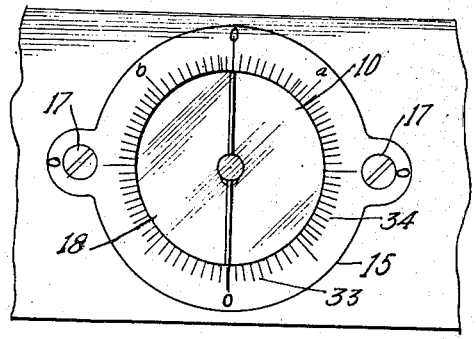
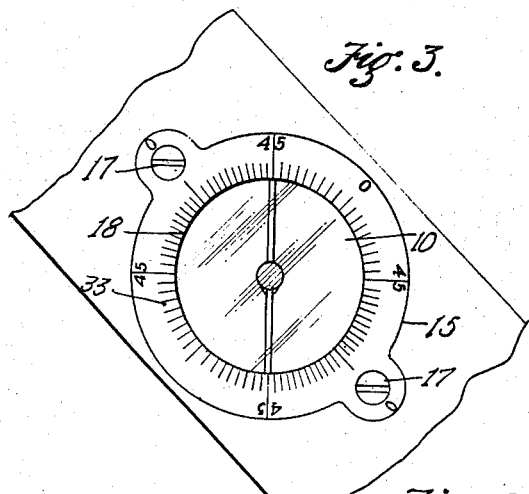
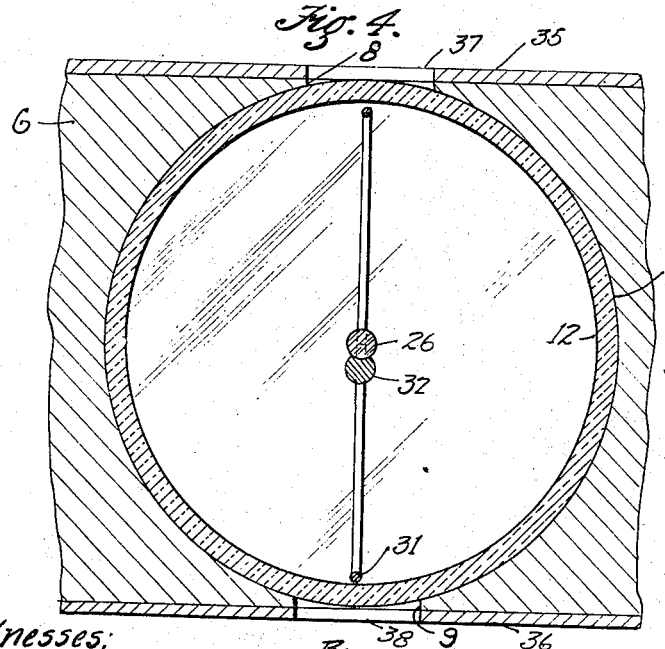
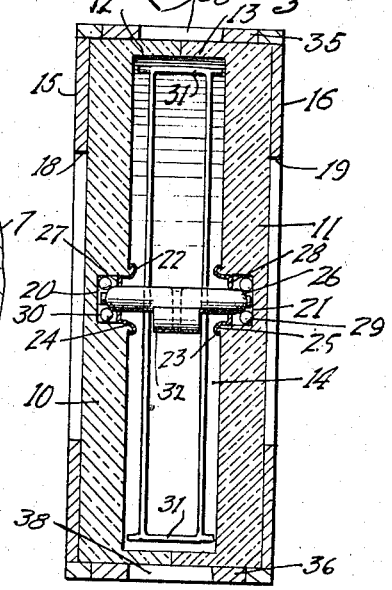
Witnesses:
James M. Abbett
Marguerite Bates
Inventor
Charles D. Caughron
Atty's

UNITED STATES PATENT OFFICE.

CHARLES DOUGLASS CAUGHRON, OF SANTA ANA, CALIFORNIA.

GRAVITY-OPERATED LEVEL.

1,141,315.  Specification of Letters Patent.  Patented June 1, 1915.

Application filed November 4, 1913. Serial No. 799,253.

*To all whom it may concern:*

Be it known that I, CHARLES D. CAUGHRON, a citizen of the United States, residing at Santa Ana, in the county of Orange, State of California, have invented new and useful Improvements in Gravity-Operated Levels, of which the following is a specification.

This invention relates to improvements in gravity operated levels.

It is the object of this invention to provide a level of the gravity operated type which is adapted to indicate angles of inclination as well as indicating horizontal levels, and which will serve as a bob in indicating perpendiculars, which is so constructed that it may be read from four sides of the stock.

A further object is to provide a gravity operated level which will indicate angles by degrees and also designate inclinations by lineal measurement, as a rise or fall in inches to the foot on the horizontal.

A further object is to provide a simple form of indicator and a protective mounting therefor which will insulate it and render it unsusceptible to magnetic attraction.

The invention primarily resides in a pair of spaced parallel glass plates having annular flanges on their inner faces adapted to abut against each other to form a dust-proof chamber, means for supporting said glass plates in a level stock, an arbor pivoted between said plates centrally thereof, an indicator comprising a wire secured to said arbor and extending corresponding distances on the opposite sides thereof, and a weight attached to said arbor for maintaining the wire in a vertical position.

The invention is illustrated in the accompanying drawings, in which:

Figure 1 is a perspective view of a level constructed in accordance with this invention. Fig. 2 is a detail side elevation of the reading dial formed with graduations for indicating degrees of inclination and also having graduations to indicate rise or fall in relation to a horizontal in lineal measurement. Fig. 3 is a corresponding detail showing the level as positioned at an angle of forty-five degrees to the horizontal and illustrating the manner of determining said inclination by the graduated scale. Fig. 4 is an enlarged detail cross section on the line 4—4 of Fig. 1. Fig. 5 is a detail vertical section on the line 5—5 of Fig. 4.

More specifically, 6 indicates the level stock which may be of any suitable description, and is here shown as consisting of the ordinary type formed of wood and rectangular in cross section. The stock 6 is formed with a circular opening 7 which extends transversely therethrough intermediate its ends and is provided for the reception of the gravity operated indicator and its casing; the stock 6 also being formed with slots 8 and 9 on its edges, which open to the opening 7 on diametrically opposite sides thereof. The housing for the indicator comprises a pair of disks 10 and 11 preferably formed of glass so as to have the combined properties of transparency and insulation so that they may be readily seen through and at the same time be non-conductive of electricity.

The disks 10 and 11 are formed of an outer periphery conforming to the inner walls of the opening 7 and formed with inwardly extending annular flanges 12 and 13, which are adapted to abut closely together when the disks are assembled, as shown in Fig. 4, to form a space 14 between the disks in which the indicator mechanism is disposed. The disks 10 and 11 when thus joined together approximately fill the space formed by the opening 7 in the stock 6 and are held in place by means of face plates 15 and 16 countersunk on the opposite sides of the stock 6 and secured thereto by means of screws 17. The face plates 15 and 16 bear against the outer faces of the disks 10 and 11 and are formed with central openings 18 and 19 concentric with the centers of the disks 10 and 11. Formed in the inner faces of the disks 10 and 11 at their centers are depressions 20 and 21, the marginal edges of which are formed with beads 22 and 23 adapted to receive and engage annular flanges formed on metallic dust caps 24 and 25. The caps 24 and 25 are cup-shaped in form and their outer peripheries snugly fit the walls of the depressions 20 and are formed with central openings for the reception of the ends of an arbor 26, which arbor projects through the caps 24 and 25 and has reduced end portions 27 and 28, which are supported on ball bearings 29 and 30 carried in the depressions 20 and 21.

The bearings 29 are thus incased in the recesses 21, as are the ends of the arbor 26, thus being effectively protected from dust; an important feature residing in the fact that the ends of the arbor 26 do not extend through the disks 10 and 11.

Mounted on the arbor 26 is an indicator 31 comprising a wire bent to form a rectangular structure, the parallel side portions of which extend through perforations in the arbor 26 and are rigidly secured therein in such manner that equal portions of the indicator will extend on opposite sides of the arbor 26 diametrically thereof. The connecting end portions of the indicator 31 are arranged to extend close to the inner faces of the flanges 12 and 13 so as to be readily discernible through the slots 8 and 9 on the edges of the stock 6.

Mounted on the underside of the arbor 26 is a weight 32 comprising a cylindrical member secured to the arbor 26 between the side members of the indicator 31; the weight 32 operating to maintain the indicator 31 in a vertical position irrespective of the inclination of the level stock 6 when the latter is in an upright position. This enables the operator to determine the angle of inclination of the stock 6, the determining of which is facilitated by forming graduations or degree marks 33 on the inner marginal edges of the face plates 15 and 16. These degree marks are shown in Fig. 2 as extending from the point —a— on the face plate 15 around to the left to the point —b— on the upper inner marginal edges of the latter; a corresponding series of graduations being formed on the lower inner marginal edge thereof; graduations 34 are formed on the plate 15 at the sides of the opening 18 and extend between the sets of degree graduations 33; these graduations 34 being designed to indicate the inclinations of the stock in lineal measure, that is to say, the number of inches of rise or fall in relation to a foot on the horizontal. Mounted on the edges of the stock 6 are face plates 35 and 36 formed with central sight openings 37 and 38 which register with the slots 8 and 9 in the stock and formed on the longitudinal edges of the slots 37 and 38 are transverse lines 39 which extend in alinement with the indicator 31 when the level stock 6 is in a true horizontal position. By this provision the operator is enabled to read the level from either its upper or lower edge in adjusting the level to the horizontal.

When the parts are assembled as shown in Fig. 4 with the flanges 12 and 13 of the disks 10 and 11 tightly joined together, the indicator 31 and its mounting are incased in a dust-proof and non-magnetic housing.

In the operation of the invention, the indicator 31 normally extends in a vertical position when the level stock 6 is in an upright position, as shown in Fig. 1. When the level stock is inclined the graduated face plates will turn in relation to the indicator 31, which can be seen through the openings 18 and 19 in the face plates 15 and 16, and will indicate the graduations according to the angle of inclination of the level stock, as illustrated in Fig. 3.

What I claim is:

1. The combination with a level stock having an opening extending laterally therethrough and slots on its upper and lower edges communicating with said opening, a transparent casing having a chamber therein and adapted to be mounted in the opening in the stock with its peripheral edges exposed through said slots, an arbor incased within said chamber and journaled in depressions in said casing opening only to the chamber therein, an indicator on said arbor, a weight for normally maintaining the indicator in a vertical position, and annular face plates formed with degree marks on opposite sides of the transparent casing by which the latter is held in place in the stock for indicating the degree of inclination of said stock.

2. In a gravity operated level, a stock having a transverse opening therethrough and a sight slot on the edge thereof communicating with said opening, a pair of transparent plates arranged within the opening, having inwardly-extending flanges joined together to form a chamber between said plates, and oppositely-disposed depressions centrally of the plates opening only to the space therebetween, an arbor arranged with its ends extending into and terminating in said depressions, ball bearings in the depressions forming an antifriction support for said arbor, an indicator on the arbor extending on the opposite sides thereof within the chamber, and a weight on said arbor for normally maintaining the indicator in a vertical position.

3. The combination with a level stock having an opening extending laterally therethrough and having slots on its upper and lower edges communicating with said opening, a transparent casing having a chamber therein and adapted to be mounted within the opening in the stock, an arbor within said casing, a pair of parallel members rigidly mounted on said arbor and extending on opposite sides thereof, having connecting end portions arranged to extend transversely across the slots in the stock adjacent thereto and a weight operating on said arbor to normally maintain said parallel members in a vertical position.

4. The combination with a level stock having an opening extending laterally therethrough and having slots on its upper and lower edges communicating with said opening, a transparent casing having a chamber therein and adapted to be mounted within the opening in the stock, an arbor within said casing, a member rigidly mounted on said arbor and extending on opposite sides thereof, having end portions arranged to extend transversely across the slots in the stock adjacent thereto and a weight operating on said arbor to normally maintain said member in a vertical position.

CHARLES DOUGLASS CAUGHRON.

Witnesses:
 LEONARD D. PHILPOT,
 W. V. FRYDENDOLL.